US012755553B2

(12) United States Patent
Alkanat et al.

(10) Patent No.: US 12,755,553 B2
(45) Date of Patent: Oct. 6, 2026

(54) VEHICLE SENSOR POINT CLOUD PROBABILITY DENSITY FUNCTION ESTIMATION BASED ON VISION SENSOR DATA

(71) Applicant: NXP B.V., Eindhoven (NL)

(72) Inventors: Tunc Alkanat, Nuenen (NL); Ashish Pandharipande, Eindhoven (NL)

(73) Assignee: NXP B.V., Eindhoven (NL)

( * ) Notice: Subject to any disclaimer, the term of this patent is extended or adjusted under 35 U.S.C. 154(b) by 418 days.

(21) Appl. No.: 18/238,007

(22) Filed: Aug. 25, 2023

(65) Prior Publication Data

US 2025/0069408 A1 Feb. 27, 2025

(51) Int. Cl.
*G06K 9/00* (2022.01)
*G01S 13/89* (2006.01)
*G06V 10/75* (2022.01)
*G06V 10/82* (2022.01)
*G06V 20/58* (2022.01)

(52) U.S. Cl.
CPC .............. *G06V 20/58* (2022.01); *G01S 13/89* (2013.01); *G06V 10/751* (2022.01); *G06V 10/82* (2022.01)

(58) Field of Classification Search
CPC ...... G06V 10/82; G06V 10/751; G06V 20/56; G06V 20/58; G06V 10/72; G01S 13/89; G01S 17/86; G01S 17/931; G01S 2013/9323; G01S 13/867; G01S 13/931; G01S 7/4802; G01S 13/865; G01S 7/417; G06N 3/044; G06N 3/0464; G06N 3/0499
See application file for complete search history.

(56) References Cited

U.S. PATENT DOCUMENTS 11,189,049 B1 * 11/2021 Chakravarty ............. G06T 7/70
2020/0089236 A1 3/2020 Doemling et al.
2020/0400810 A1 * 12/2020 Cho .................... G01S 13/9047
2021/0063578 A1 * 3/2021 Wekel .................... G01S 17/894
2022/0028180 A1 1/2022 Wong et al.
2022/0083792 A1 3/2022 Naseer et al.

(Continued)

OTHER PUBLICATIONS

Palais, Richard, Bob Palais, and Hermann Karcher. "Pointclouds: Distributing points uniformly on a surface." arXiv preprint arXiv: 1611.04690 (2016). (Year: 2016).*

(Continued)

*Primary Examiner* — Gregory A Morse
*Assistant Examiner* — Owais I Memon

(57) ABSTRACT

Techniques for using machine learning to produce vehicle location sensor data from vision sensor data are disclosed. By using a limited amount of vehicle location sensor data together with vision sensor data, a deep learning network can be trained to produce estimated vehicle location sensor point cloud distributions from, e.g., vision sensor data alone. Using a deep learning network trained in this way, vehicles with limited or no sensor functionality can be equipped with a camera to produce estimated vehicle location sensor point cloud distributions. These estimated vehicle location sensor point cloud distributions can then be compared with general sensor point cloud distributions to improve detection of vehicles, environmental objects, and ghost objects, and subsequently used to improve vehicle safety through vehicle controls or driver notifications and/or to produce enhanced sensor data.

17 Claims, 9 Drawing Sheets

(56) References Cited

U.S. PATENT DOCUMENTS

2023/0343026 A1* 10/2023 Wang .................... G06T 19/20
2024/0013477 A1* 1/2024 Xu .......................... G06T 15/08

OTHER PUBLICATIONS

Chamseddine, Mahdi, et al. "Ghost Target Detection in 3D Radar Data Using Point Cloud Based Deep Neural Network", 2020 25th International Conference on Pattern Recognition (ICPR); Jan. 10-15, 2021; pp. 10398-10403.
Chen, Xuanyao et al., "FUTR3D: A Unified Sensor Fusion Framework for 3D Detection", arXiv preprint arXiv:2203.10642; Mar. 20, 2022; 14 pages.
Cheng, Y. et al., "A New Automotive Radar 4D Point Clouds Detector by Using Deep Learning", 2021 IEEE International Conference on Acoustics, Speech and Signal Processing (ICASSP), Jun. 6, 2021, pp. 8398-8402.
Kim, Youngseok et al., "GRIF Net: Gated Region of Interest Fusion Network for Robust 3D Object Detection from Radar Point Cloud and Monocular Image", 2020 IEEE/RSJ International Conference on Intelligent Robots and Systems (IROS), Oct. 25-29, 2020, pp. 10857-10864.
Nabati, Ramin et al. "CenterFusion: Center-based Radar and Camera Fusion for 3D Object Detection", 2021 IEEE Winter Conference on Applications of Computer Vision (WACV); Jan. 3-8, 2021; pp. 1527-1536.
Prabhakara, Akarsh et al., "High Resolution Point Clouds from mmWave Radar", https://arxiv.org/pdf/2206.09273.pdf; Jun. 18, 2022; 15 pages.
Wang, LeiChen et al., "L2R GAN: LiDAR-to-Radar Translation", Proceedings of the Asian Conference on Computer Vision 2020; published Feb. 25, 2021; 16 pages.
Wang, LeiChen, et al. "Radar Ghost Target Detection via Multimodal Transformers", IEEE Robotics and Automation Letters 6.4; Jul. 27, 2021; pp. 7758-7765.
U.S. Appl. No. 18/238,004, filed Aug. 25, 2023, entitled "Sensor Point Cloud Probability Density Function Estimation Based on Vision Sensor Data", having inventors Tunc Alkanat and Ashish Pandharipande.
U.S. Appl. No. 18/238,004 Non-Final Office Action issued on Nov. 25, 2025, 18 pages.
U.S. Appl. No. 18/238,004 Final Office Action issued on Mar. 12, 2026, 20 pages.

* cited by examiner

VEHICLE SENSOR POINT CLOUD PROBABILITY DENSITY FUNCTION ESTIMATION BASED ON VISION SENSOR DATA

BACKGROUND

Radar data is often used to improve vehicle safety. For example, radar-based object avoidance and collision avoidance are often utilized in vehicles in order to notify drivers of nearby objects, such when the driver is parking a vehicle, or even to automatically apply a vehicle's brakes when an impending collision is detected. However, radar data can be inaccurate and typically suffers from performance degradation in cluttered environments, which can result in false alarms due to ghost object detections, such as reflections from an actual object due to a static guard rail in the street. It is therefore desirable to use machine learning techniques to improve radar data derived from those sensors. One point of difficulty in utilizing machine learning to improve radar data is that machine learning techniques typically require a large amount of training data, which can be difficult to obtain, in order to train deep learning networks to be useful for improving radar data or related systems. Accordingly, it is desirable to identify practical ways to leverage machine learning to improve radar data or related systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-9 illustrate techniques for using machine learning to produce vehicle location sensor data from vision sensor data. As noted above, machine learning techniques typically require a large amount of well-labeled training data, which can be difficult to obtain, in order to train deep learning networks to be useful for improving sensor data or related systems. Although large amounts of well-labeled training data are not typically readily available for, e.g., radar applications, large amounts of well-labeled training data are available for, e.g., vision sensor data of roads. By using a limited amount of vehicle location sensor data, such as radar and/or light detection and ranging (LiDAR) data, together with such vision sensor data, a deep learning network can be trained to produce estimated sensor point cloud distributions (i.e., from vision sensor data alone). Generally, a sensor point cloud distribution refers to a collection of data points typically generated using a sensor, such as a radar or LiDAR sensor, where each point represents a detected object's position in three-dimensional space, often along with additional attributes such as velocity or cross-section. Using a deep learning network trained in this way, vehicles with limited or no radar or other sensor functionality can be equipped with a vision sensor to produce estimated vehicle location sensor point cloud distributions (i.e., an estimated distribution of points of interest that should be detectable using a sensor such as a radar or LiDAR sensor). These estimated vehicle location sensor point cloud distributions can then be used to improve vehicle safety through vehicle controls or driver notifications and/or to produce enhanced sensor data.

Figure 1:
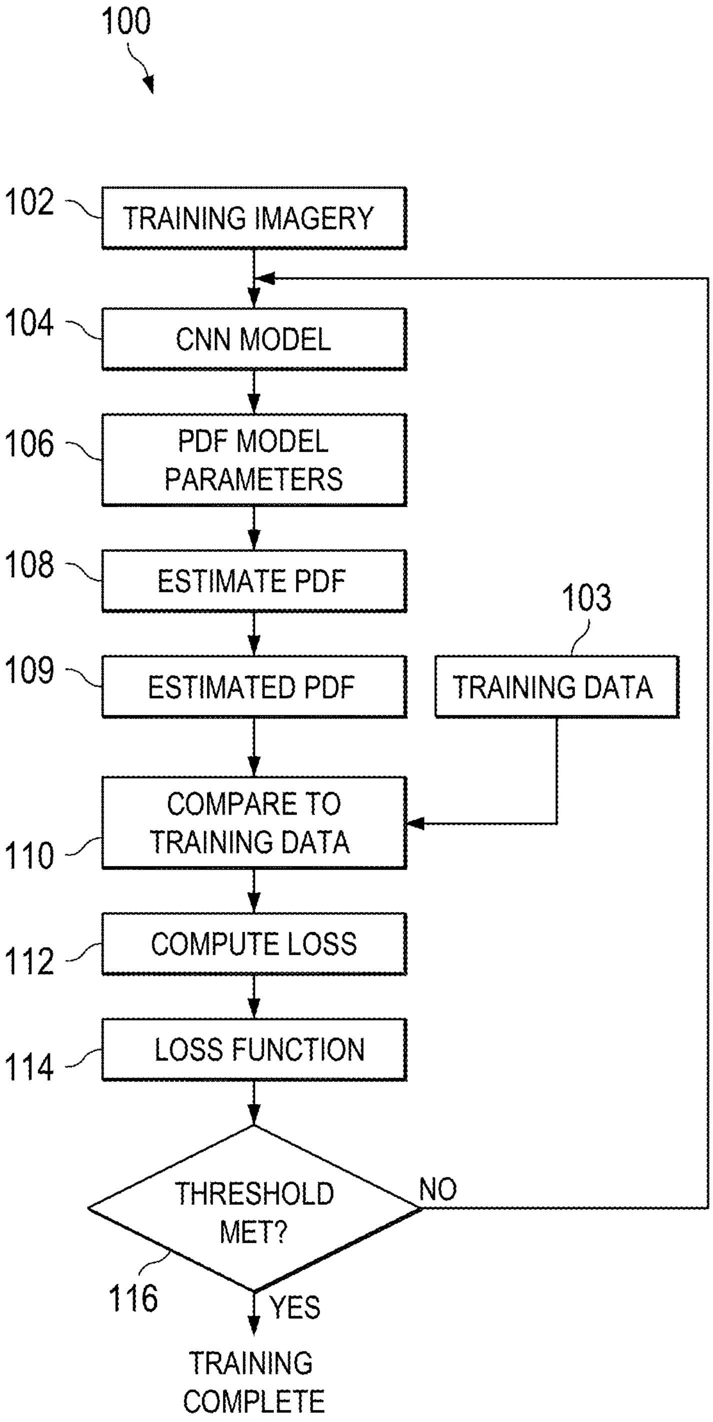
FIG. 1 is a block diagram of a method of training a deep learning network to produce an estimated sensor point cloud distribution based on vision sensor data in accordance with some embodiments.

FIG. 1 illustrates a method 100 of training a deep learning network to produce an estimated sensor point cloud distribution based on vision sensor data in accordance with some embodiments. In order to provide a clear explanation of various features of the method 100, FIG. 1 is discussed in connection with FIG. 2, which provides a representation of one or more photographic image 200, which may include one or more camera images, alongside a corresponding estimated sensor point cloud distribution 250 with overlaid training data 254. In order to produce an estimated sensor point cloud distribution based on vision sensor data using a deep learning network, in some embodiments, the deep learning network is first trained using labeled training imagery 102 (see, e.g., the photographic image 200 of FIG. 2) and other training data 103, which may include sensor data such as a ground truth point cloud (e.g., a low-resolution known distribution of points of interest that are detected using a sensor such as a radar or LiDAR sensor) corresponding to (e.g., co-centered with) the training imagery 102 (see, e.g., the training data 254 of FIG. 2).

In the example of FIG. 1, the training imagery 102 is provided as an input to a deep learning network, in this case a convolutional neural network (CNN) model 104, although it is noted that other types of deep learning networks can be used in place of or in addition to a CNN model, such as a Multi-Layer Perceptron model or a Recurrent Neural Network model, among others. The CNN model 104 processes the training imagery 102 (see, e.g., the photographic image 200 of FIG. 2) to produce one or more probability density function (PDF) parameters 106 (e.g., Gaussian mixture model parameters or other statistical modeling parameters, such as mean, variance, and weight parameters), which are then used (e.g., in a Gaussian mixture model or other statistical model) to estimate a PDF 108, thus producing an estimated PDF 109 (see, e.g., the estimated sensor point cloud distribution 250 of FIG. 2) corresponding to the training imagery 102. In some embodiments, the other training data 103 includes point clouds at a first resolution, and the estimated sensor point cloud distribution 250 has a second resolution higher than the first resolution.

Generally, a PDF is a function whose value at any given sample (or point) in the sample space (the set of possible values taken by a random variable) can be interpreted as providing a relative likelihood that the value of the random variable would be equal to that sample. Accordingly, the value of a PDF at two different samples can be used to infer, in any particular draw of the random variable, how much more likely it is that the random variable would be close to one sample compared to the other sample. The estimated PDF 109 should (after sufficient training of the deep learning network) include higher likelihood values in regions where sensor points are likely to be found and lower likelihood values otherwise. Notably, in this example, the estimated PDF 109 provides estimated regions of high and low likelihood of sensor points derived from the training imagery 102 but does not include the training data 254 shown in FIG. 2. For clarity, another example of an estimated sensor point cloud distribution without overlaid training data is shown in the estimated sensor point cloud distribution 350 of FIG. 3.

Figure 2:
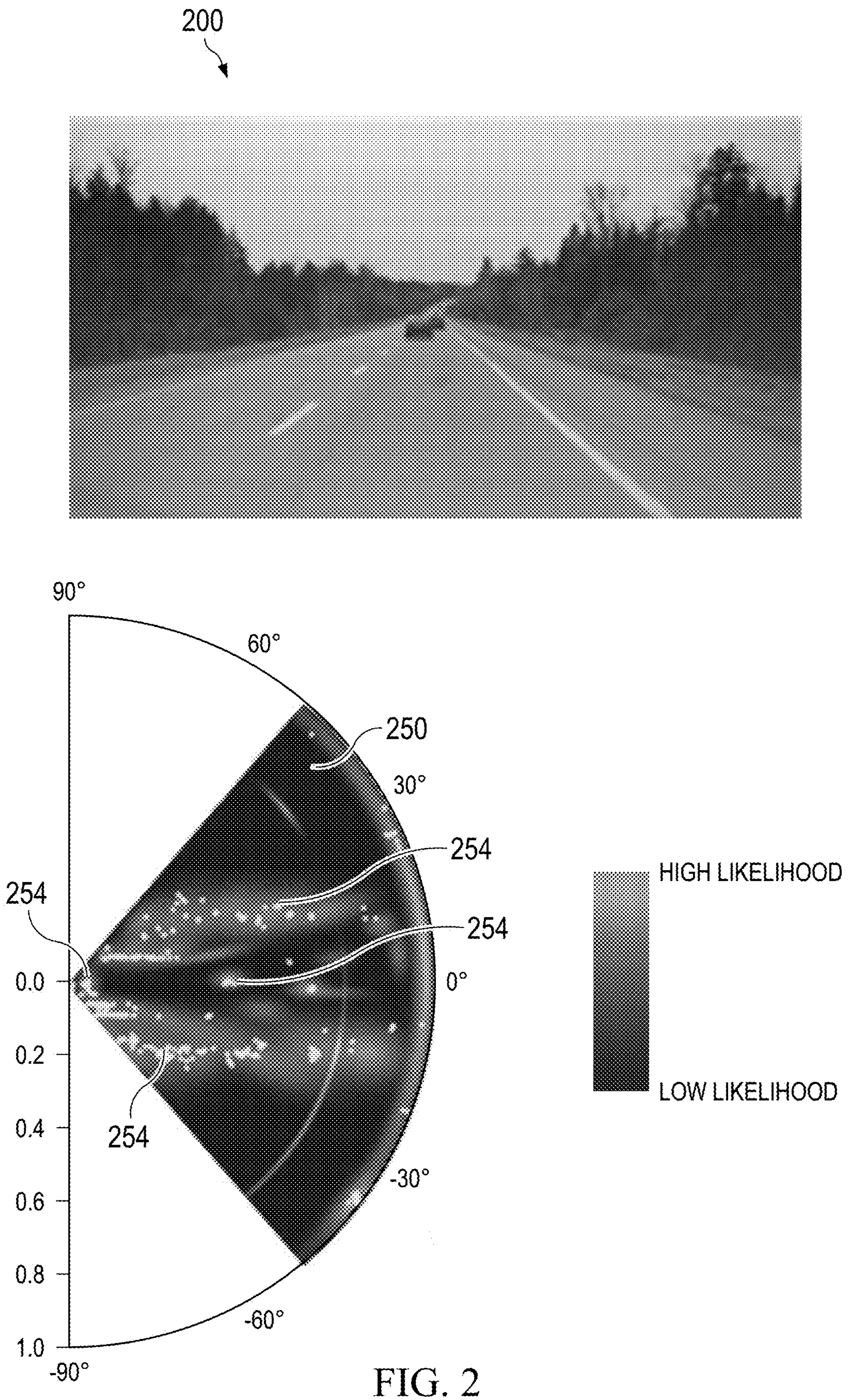
FIG. 2 is a representation of a photographic image alongside a corresponding estimated sensor point cloud distribution with overlaid training data.

As can be seen in FIG. 2 by comparing the high likelihood regions in the estimated sensor point cloud distribution 250 (corresponding to an estimated PDF 109) with locations of the training data 254, after training is complete, the PDF 109 can be used to closely predict the locations of the training data 254 using only vision sensor data. However, before this level of accuracy can be achieved, in some embodiments, the deep learning network is first trained by comparing the estimated PDF 109 to the other training data 103 and modifying the CNN model 104 to maximize the likelihood of the other training data 103 (e.g., the training data 254 of FIG. 2) in the estimated PDF 109 (e.g., the estimated sensor point cloud distribution 250 of FIG. 2).

In the example of FIG. 1, the estimated PDF 109 is compared 110 with the other training data 103 to compute a conditional probability (a type of probability that results from updating a prior probability with information summarized by the likelihood via an application of Bayes' rule), after which a loss function 112 is used to compute a loss function 114, which gauges a difference between the PDF 109 and the other training data 103 and maximizes a posteriori probability of the other training data to the estimated sensor point cloud distribution (e.g., PDF 109). After computing the loss function 114, the loss function 114 is compared to a threshold 116, which may be predetermined or dynamically controlled. In other embodiments, rather than comparing the loss function 114 to a threshold 116, the threshold 116 controls a number of iterations, allowing training to be limited to a predetermined number of iterations. In some embodiments, a sensor point cloud is generated from the estimated sensor point cloud distribution as a realization with likelihood values that exceed a threshold. Such embodiments may include comparing the estimated sensor point cloud distribution with the other training data corresponding to the vision sensor training data to obtain a loss function, generating a sensor point cloud from the estimated sensor point cloud distribution as a realization, and comparing likelihood values in the sensor point cloud with a predetermined threshold to determine whether training of the deep learning network is complete.

The CNN model 104 is updated based on the loss function, and when the threshold 116 is met, the method 100 of training of the CNN model 104 is complete. However, if the threshold 116 is not met or further training is otherwise desired, the method 100 provides the same or different training imagery 102 to the CNN model 104 and the training process is repeated, with each iteration aiming to further minimize any differences between regions of high likelihood in the estimated PDF 109 (e.g., the estimated sensor point cloud distribution 250 of FIG. 2) and the other training data 103 (e.g., the training data 254 of FIG. 2 or different training data corresponding to different training imagery).

Notably, the training imagery 102 may be prerecorded imagery or live imagery recorded by an on-board vehicle system, which may include one or more sensors (e.g., photographic, radar, etc.). Similarly, the other training data 103, which may include the training data 254 shown in FIG. 2, may be prerecorded or live sensor data recorded by an on-board vehicle system. In some embodiments, the other training data 103 and/or estimated PDF 109 include 2-4 dimensions, such as range, azimuth, elevation, and Doppler (i.e., relative speed) information. In some embodiments, an estimated sensor point cloud distribution such as the estimated sensor point cloud distribution 250 of FIG. 2 is a radar point cloud distribution including estimated radar points having range, azimuth, elevation, and Doppler information, and the other training data 103 includes radar points having range and azimuth information.

In some embodiments, the estimated PDF 109 is generated using a parametric Gaussian mixture model (GMM), as shown in Equation 1, where K represents the number of components in the GMM, $\mathcal{N}$ represents each Gaussian, and $p(\vec{x})$ is the resulting point cloud PDF. Parameters $\vec{\mu}_i$ and $\Sigma_i$, which are vectors and matrices, respectively, can include from 2-4 dimensions, while $\phi_i$ is a weighting parameter for each Gaussian $\mathcal{N}$.

$$p(\vec{x}) = \sum_{i=1}^{K} \phi_i N\left(\vec{x} \mid \vec{\mu}_i, \sum\nolimits_i\right) \tag{1}$$

Due to the definition of the Gaussian mixture model, in some embodiments, Equation 2 must be satisfied, forcing the weighting parameters $\phi_i$ for each Gaussian $\mathcal{N}$ to sum to 1.

$$\sum_{i=1}^{K} \phi_i = 1 \tag{2}$$

The Gaussians $\mathcal{N}$ are defined by Equation 3.

$$N\left(\vec{x} \mid \vec{\mu}_i, \sum\nolimits_i\right) = \frac{1}{\sqrt{(2\pi)^K \left|\sum_i\right|}} \exp\left(-\frac{1}{2}(\vec{x} - \vec{\mu}_i)^T \sum\nolimits_i^{-1} (\vec{x} - \vec{\mu}_i)\right) \tag{3}$$

In some embodiments, the loss function 114 is computed using Equation 4, where L is the loss, N represents the number of points in the point cloud $\vec{x}$, θ represents GMM parameters as determined by the deep learning network (e.g., CNN model 104), and α is a tuning parameter usable to tune properties of the PDF p (e.g., to provide a sharpening effect). By using a loss function similar to the one presented in Equation 4, a deep learning network can be trained to provide a maximized likelihood in a region of an estimated PDF or estimated sensor point cloud distribution wherever a training sensor point is located.

$$L(\vec{x};\theta)=\sum_{n=1}^{N}\max(\alpha-p(\vec{x}[n];\theta),0) \tag{4}$$

Figure 3:
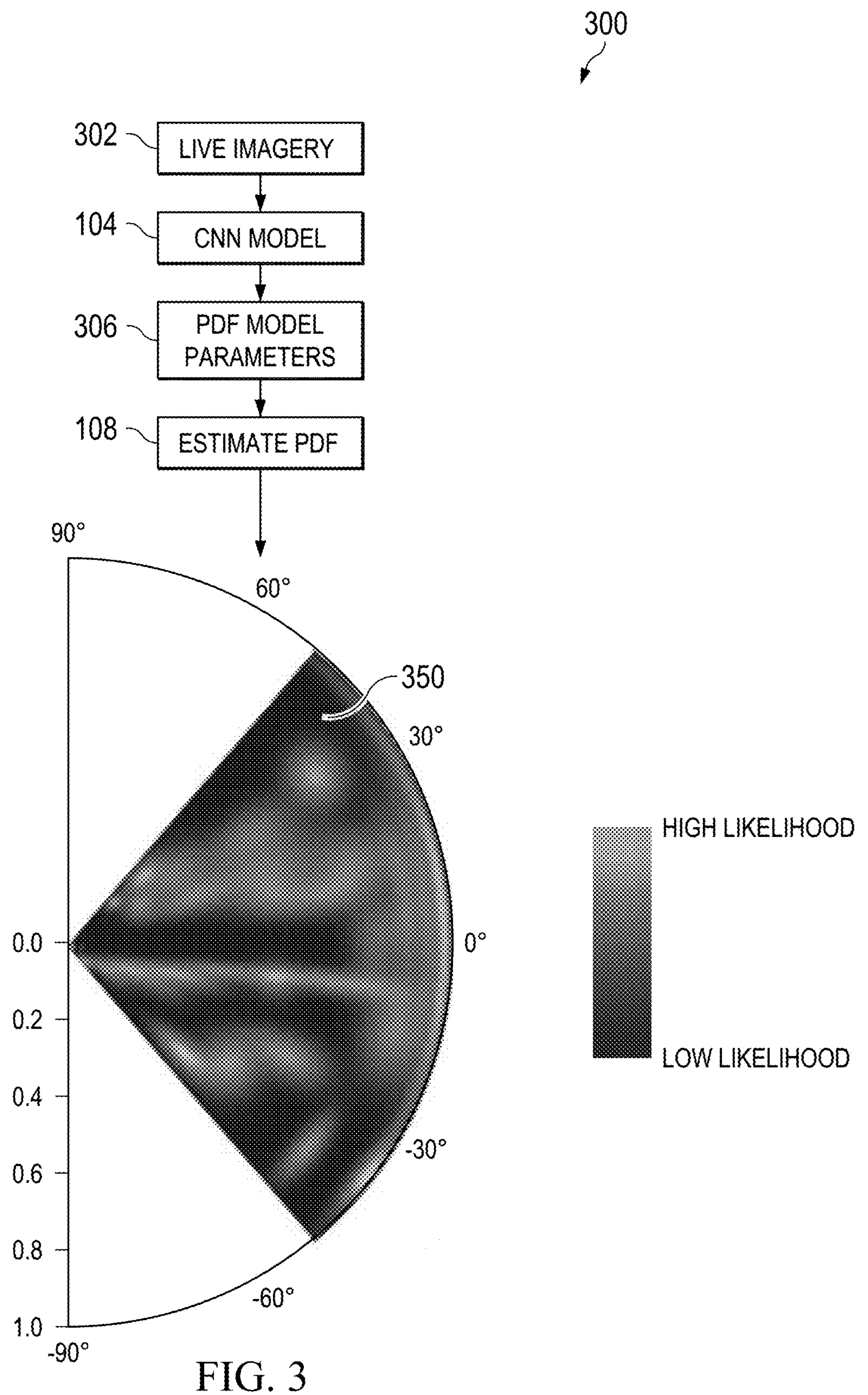
FIG. 3 is a block diagram of a method of producing an estimated sensor point cloud distribution based on vision sensor data in accordance with some embodiments.

FIG. 3 illustrates a method 300 of producing an estimated sensor point cloud distribution based on vision sensor data in accordance with some embodiments. Similar to the training example of FIG. 1 but with the training steps omitted, as can be seen in FIG. 3, rather than the training imagery 102, live imagery 302 is provided as an input to a trained deep learning network, in this case the CNN model 104 trained using the training method 100 of FIG. 1. The CNN model 104 processes the live imagery 302 (similar to the photographic image 200 of FIG. 2, although the live imagery 302 can include still images and/or videos or sets of images) to produce one or more PDF parameters 306, which are then used (e.g., in a Gaussian mixture model or other statistical model) to estimate a PDF 108, which can be used to generate an estimated sensor point cloud distribution 350 corresponding to the live imagery 302 by inference, e.g., with high- or super-resolution, without requiring any sensor data to be provided corresponding to the live imagery 302.

While the method 100 of FIG. 1 may be performed by a training system separate from any vehicle or in an on-board vehicle system, the method 300 and other methods described hereinbelow for generating estimated sensor point cloud distributions may be performed partially or completely by an on-board vehicle system. However, in some embodiments, some portions of the methods may be performed by external (e.g., cloud or server-based) computing systems. For example, in some embodiments, live imagery 302 is obtained using an on-board vehicle system while analysis of the live imagery 302 by the CNN model 104, generation of the PDF model parameters 306, estimating the PDF 108, and/or generating the estimated sensor point cloud distribution 350 are performed by external computing systems in communication (e.g., WiFi or cellular) with the on-board vehicle system.

Figure 4:
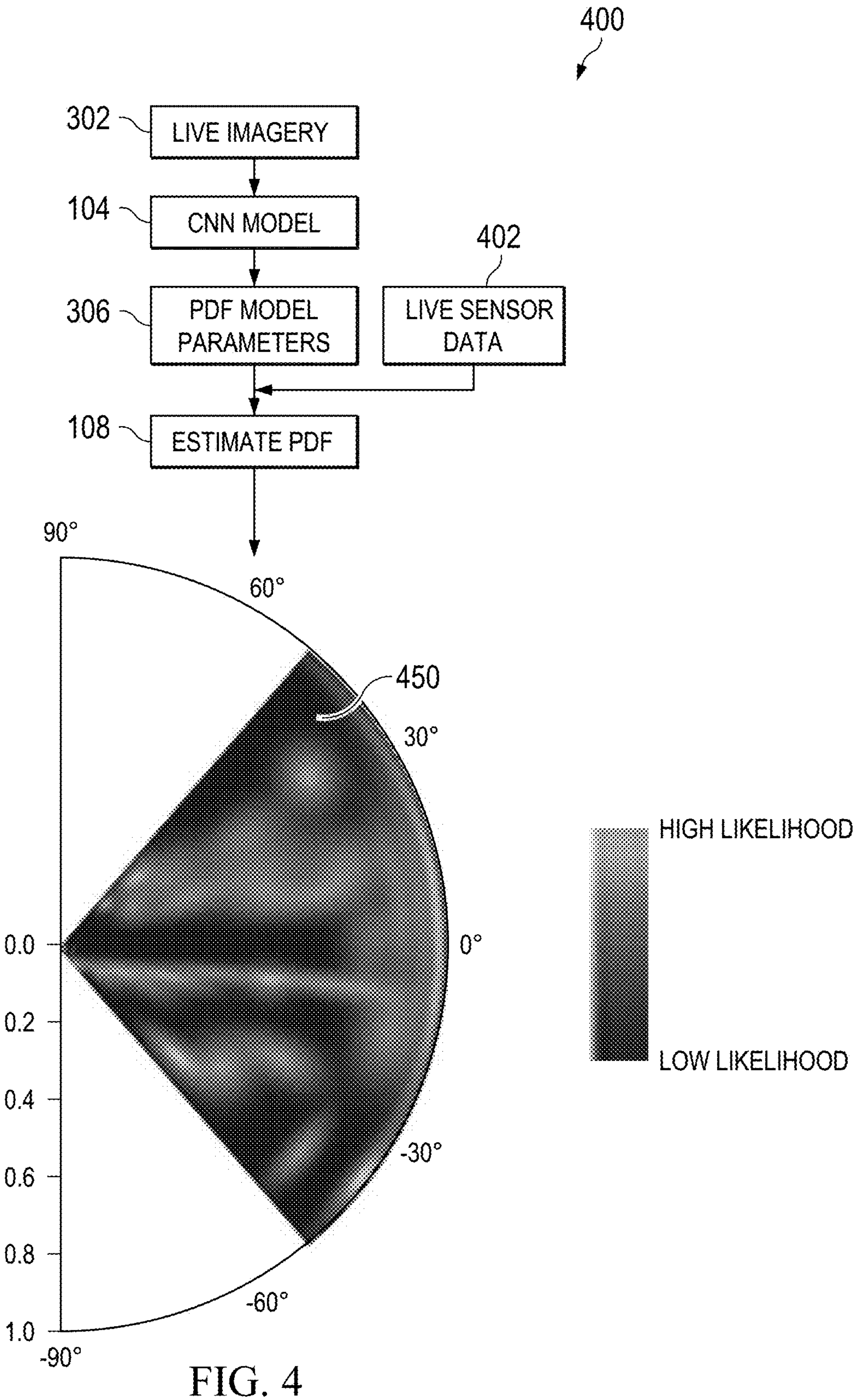
FIG. 4 is a block diagram of a method of producing an estimated sensor point cloud distribution based on vision sensor data and other sensor data in accordance with some embodiments.

FIG. 4 illustrates a method 400 of producing an estimated sensor point cloud distribution based on vision sensor data and other sensor data in accordance with some embodiments. As shown in FIG. 4, the method 400 is identical to the method 300 with the exception of live sensor data 402. In the example of method 400, when live sensor data 402 corresponding to the live imagery 302 is available, estimating the PDF 108 can include consideration of the live sensor data 402. Thus, rather than generating a PDF producing an estimated sensor point cloud distribution 450 based only on analysis of the live imagery 302 as in method 300, in method 400, the estimated PDF and/or estimated sensor point cloud distribution 450 is created or modified based on the live sensor data 402 in addition to the live imagery 302.

For example, in some embodiments, a correlation between the live sensor data 402 and the estimated PDF or the estimated sensor point cloud distribution 450 is determined and the estimated PDF or estimated sensor point cloud distribution 450 is created or modified based on the correlation. For example, when sensor points in the live sensor data 402 and high likelihood regions of the estimated sensor point cloud distribution 450 coincide, the estimated PDF or estimated sensor point cloud distribution 450 may be modified based on the identified correlation, e.g., by further increasing the likelihood of the high likelihood region corresponding to a sensor point in the live sensor data 402 and/or increasing a confidence level associated with the high likelihood region corresponding to a sensor point in the live sensor data 402. Similarly, when sensor points in the live sensor data 402 and low likelihood regions of the estimated sensor point cloud distribution 450 coincide, the estimated PDF or estimated sensor point cloud distribution 450 may be modified based on the lack of an identified correlation, e.g., by increasing the likelihood of the low likelihood region corresponding to a sensor point in the live sensor data 402 and/or decreasing a confidence level associated with the low likelihood region corresponding to a sensor point in the live sensor data 402. Additionally, when no sensor points in the live sensor data 402 coincide with high likelihood regions of the estimated sensor point cloud distribution 450, the estimated PDF or estimated sensor point cloud distribution 450 may be modified based on the lack of an identified correlation, e.g., by decreasing the likelihood of the high likelihood region lacking any coinciding sensor points in the live sensor data 402 and/or decreasing a confidence level associated with the high likelihood region lacking any coinciding sensor points in the live sensor data 402. Notably, although "live" imagery and "live" sensor data are referred to herein for clarity and convenience, previously recorded imagery, and optionally previously recorded sensor data corresponding to that recorded imagery, can be used in place of "live" imagery and data in various methods disclosed herein to generate estimated PDFs and/or estimated sensor point cloud distributions for the recorded imagery and data.

Figure 5:
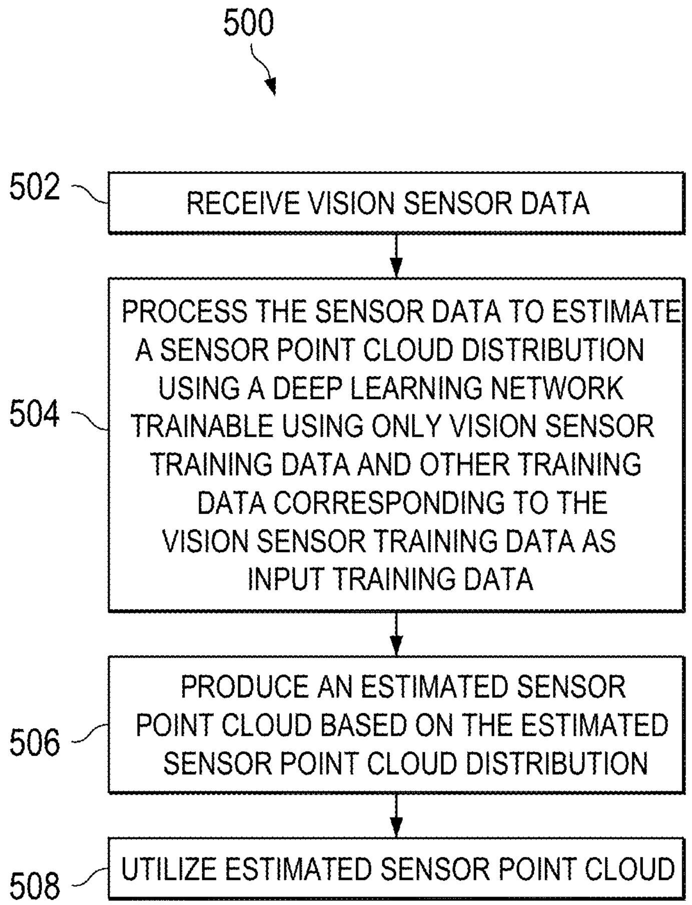
FIG. 5 is a block diagram of a method of producing and using an estimated sensor point cloud distribution based on vision sensor data in accordance with some embodiments.

FIG. 5 illustrates a method 500 of producing and using an estimated sensor point cloud distribution based on vision sensor data in accordance with some embodiments. As shown in FIG. 5, the method 500 includes, at block 502, receiving vision sensor data, such as the photographic image 200 of FIG. 2. At block 504, the method 500 includes processing the vision sensor data to estimate a sensor point cloud distribution, such as point cloud PDFs or other parameters, where the processing is performed using a deep learning network trainable using only vision sensor training data and other training data corresponding to the vision sensor training data as input training data, such as a deep learning network trained using the method 100 of FIG. 1. At block 506, the method 500 includes producing an estimated sensor point cloud distribution based on the estimated sensor point cloud distribution similar to the estimated sensor point cloud distribution 450 of FIG. 4. At block 508, the method 500 includes utilizing the estimated sensor point cloud distribution.

The estimated sensor point cloud distribution can be used as the basis for any of a number of applications, ranging from notifying an occupant of a vehicle of an approaching object or a turn identified in the estimated sensor point cloud distribution to directly controlling a vehicle, e.g., applying brakes or acceleration to avoid colliding with an approaching object or automatedly turning, e.g., via the steering wheel, when an upcoming turn is identified. As discussed above in connection with FIG. 4, in some embodiments, the estimated sensor point cloud distribution is used to improve live sensor data. In other embodiments, an estimated PDF or estimated sensor point cloud distribution is modified based on live sensor data to produce an improved estimated sensor point cloud distribution. In some embodiments, the estimated PDF or estimated sensor point cloud distribution is used to increase the granularity and/or dimensionality of live sensor data, e.g., by adding sensor points and/or converting 2D (or 3D) live sensor data to 3D (or 4D) live sensor data. In some embodiments, the estimated PDF or estimated sensor point cloud distribution is used, along with corresponding vision sensor data, as training data for other machine learning applications. Thus, methods disclosed herein are not only usable for producing sensor data from vision sensor data for the purposes of utilizing that sensor data in a live or "real-time" application, but also for producing vast quantities of sensor data for vision sensor data in order to enable further deep learning applications that may require such quantities of corresponding sensor data and vision sensor data.

Figure 6:
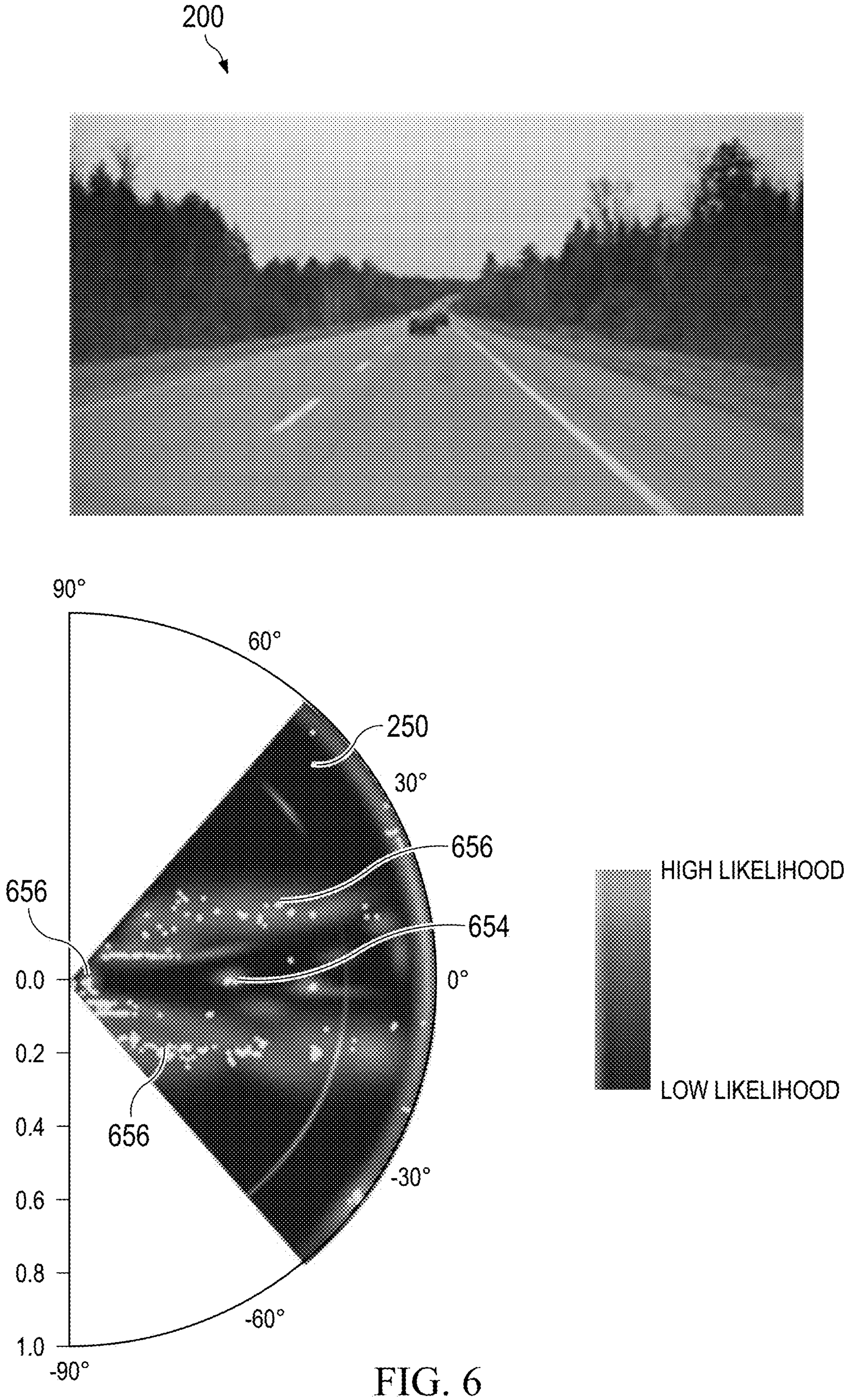
FIG. 6 is a representation of a photographic image alongside a corresponding estimated sensor point cloud distribution with overlaid training data including vehicle location training data.

In some implementations, in order to increase the usefulness of estimated sensor point cloud distributions, it is desirable to produce an estimated vehicle location sensor point cloud distribution where only vehicles are identified as high likelihood regions. In order to produce vehicle location sensor point cloud distributions, the same methods described above (e.g., methods 100, 300, 400, 500) can be used, but with different other training data 103 specific to vehicle locations and a different loss function. For example, FIG. 6 illustrates a photographic image alongside a corresponding estimated sensor point cloud distribution with overlaid training data including vehicle location training data. By limiting the other training data 103 to vehicle location training data 654 and excluding other training data 656, a deep learning network can be trained to produce estimated vehicle location sensor point cloud distributions based only on vision sensor data.

In some embodiments, in order to produce vehicle location sensor point cloud distributions, a different loss function from that specified in Equation 4 above is used, such as that specified below in Equation 5. By using a loss function similar to the one presented in Equation 5, a deep learning network can be trained to provide a maximized likelihood in a region of an estimated PDF or estimated sensor point cloud distribution wherever a training vehicle location sensor point is located while forcing other regions to minimum values.

$$L(\vec{x};\theta)=\begin{cases}\sum_{n=1}^{N}\max\left(\alpha-p\left(\vec{x}[n];\theta\right),0\right), & \text{if } N\neq 0\\ \frac{1}{K}\sum_{i=1}^{K}\phi_i\end{cases}\tag{5}$$

Figure 7:
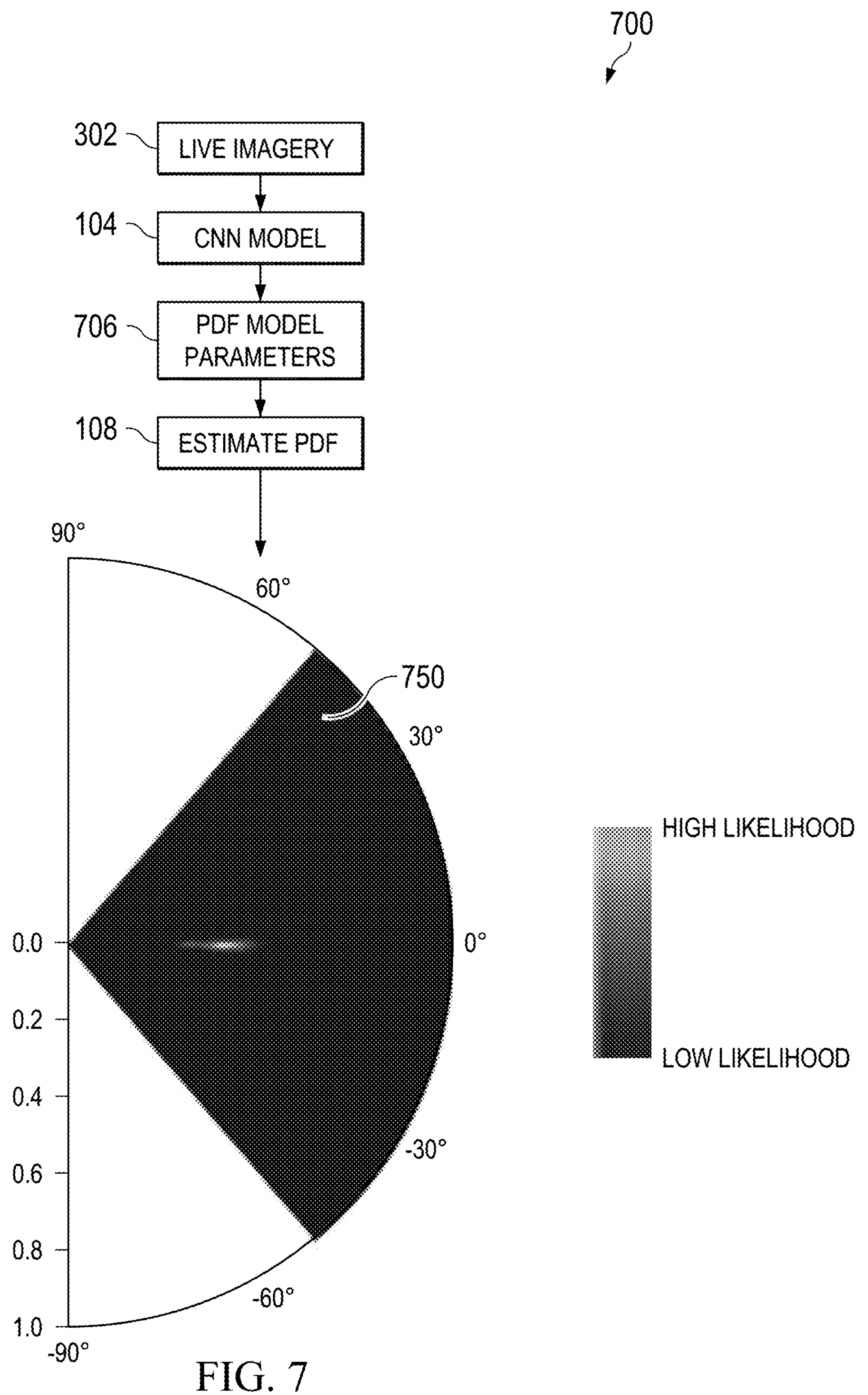
FIG. 7 is a block diagram of a method of producing an estimated vehicle location sensor point cloud distribution based on vision sensor data in accordance with some embodiments.

FIG. 7 illustrates a method 700 of producing an estimated vehicle location sensor point cloud distribution based on vision sensor data in accordance with some embodiments. Similar to the training example of FIG. 1 but with the training steps omitted, as can be seen in FIG. 7, rather than using training imagery 102, live imagery 302 is provided as an input to a trained deep learning network, in this case the CNN model 104 trained using the training method 100 of FIG. 1 with vehicle location training data like the vehicle location training data 654 of FIG. 6. The CNN model 104 processes the live imagery 302 (similar to the photographic image 200 of FIG. 6, although the live imagery 302 can include still images and/or videos or sets of images) to produce one or more vehicle location PDF parameters 706, which are then used (e.g., in a Gaussian mixture model or other statistical model) to estimate a vehicle location PDF 108, which can be used to generate an estimated vehicle location sensor point cloud distribution 750 corresponding to the live imagery 302 without requiring any sensor data to be provided corresponding to the live imagery 302. As shown in FIG. 7, after sufficient training, the method 700 is able to produce the estimated vehicle location sensor point cloud distribution 750 where only vehicles or vehicle-adjacent regions are identified as high likelihood regions.

In some embodiments, the vehicle location PDF 108 and/or estimated vehicle location sensor point cloud distribution 750 are modified based on live sensor data 402 in a similar way to how the PDF 108 and/or estimated sensor point cloud distribution 450 are updated based on live sensor data 402, as discussed above with reference to FIG. 4. Further, in some embodiments, general (e.g., non-vehicle specific) estimated sensor point cloud distributions such as the estimated sensor point cloud distributions 350 or 450 of FIGS. 3 and 4 (or corresponding general PDFs) are compared with an estimated vehicle location sensor point cloud distribution such as the vehicle location sensor point cloud distribution 750 of FIG. 7 (or corresponding vehicle PDFs) in order to identify vehicles, environmental objects, and ghost objects (e.g., false positives) with higher confidence.

For example, when an estimated vehicle location sensor point cloud distribution includes a high likelihood region coinciding with a high likelihood region of a general estimated sensor point cloud distribution, it can be deduced that this coinciding region corresponds to a vehicle with reasonably high confidence. On the other hand, when an estimated vehicle location sensor point cloud distribution includes a low likelihood region coinciding with a high likelihood region of a general estimated sensor point cloud distribution, it can be deduced that this coinciding region corresponds to an environmental object with reasonably high confidence. When an estimated vehicle location point cloud distribution includes a low likelihood region coinciding with a low likelihood region of a general estimated sensor point cloud distribution, it can be deduced that this coinciding region corresponds to a ghost object with reasonably high confidence. Accordingly, by comparing estimated vehicle location sensor point cloud distributions with general estimated sensor point cloud distributions, ghost objects can be eliminated or assigned a lower confidence value, while vehicles and/or environmental objects can be identified and/or assigned higher confidence values.

As an example, in some embodiments, after obtaining the estimated vehicle location sensor point cloud distribution and the general estimated sensor point cloud distribution, the posterior probability of each point in the co-centered sensor point cloud distribution is evaluated on both PDFs. If $p_1(x|\theta)$ and $p_2$2 $(x|\theta)$ are the posterior probabilities computed for a sensor point x using the general estimated sensor point cloud distribution PDF and estimated vehicle location sensor point cloud distribution PDF, respectively, based on these likelihoods, in some embodiments, point x is classified as shown in the relationships 6-8 below (i.e., example fusion rules), where $\tau_1$ and $\tau_2$ are configurable thresholds. Notably, in some embodiments, a collection of polar coordinates, z, that do not have a point in an estimated sensor point cloud distribution in close vicinity, and for which $p_2(z|\theta)>\tau_2$, are considered as missed detections (or a confidence of those coordinates corresponding to a missed detection is increased).

If $p_1(x|\theta)>\tau_1$ and $p_2(x|\theta)>\tau_2$, $x$is likely avehicle (6)

If $p_1(x|\theta)>\tau_1$ and $p_2(x|\theta)<\tau_2$, $x$ is likely an environmental object (7)

If $p_1(x|\theta)<\tau_1$ and $p_2(x|\theta)<\tau_2$, $x$ is likely a ghost object (8)

In some embodiments, the estimated vehicle location sensor point cloud distribution or the general sensor point cloud distribution is modified based on the comparison, e.g., to eliminate ghost objects and/or increase confidence values for vehicles and/or environmental objects. Notably, when both general estimated sensor point cloud distributions and estimated vehicle location sensor point cloud distributions are produced using the same system or related systems, one or more parameters of the CNN models 104 can be shared between the CNN model 104 used to produce general estimated sensor point cloud distributions and the CNN model 104 used to produce estimated vehicle location sensor point cloud distributions.

Figure 8:
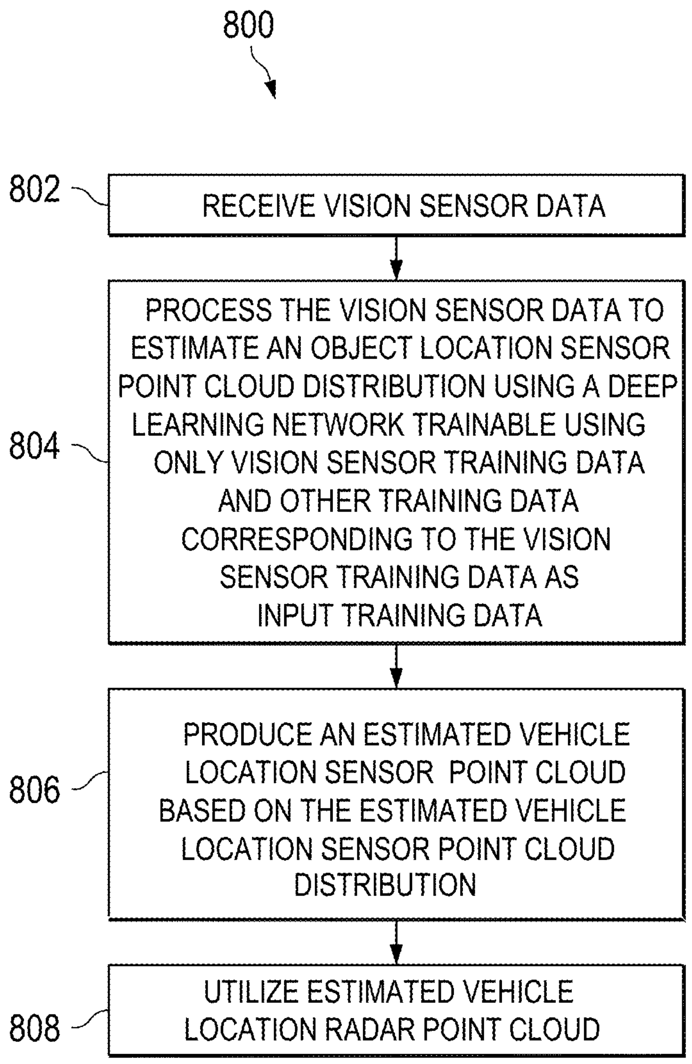
FIG. 8 is a block diagram of a method of producing and using an estimated vehicle location sensor point cloud distribution based on vision sensor data in accordance with some embodiments.

FIG. 8 illustrates a method 800 of producing and using an estimated vehicle location sensor point cloud distribution based on vision sensor data in accordance with some embodiments. As shown in FIG. 8, the method 800 includes, at block 802, receiving vision sensor data, such as the photographic image 200 of FIG. 6. At block 804, the method 800 includes processing the vision sensor data to estimate a vehicle location sensor point cloud distribution, such as point cloud PDFs or other parameters, where the processing is performed using a deep learning network trainable using only vision sensor training imagery and vehicle location training data corresponding to the vision sensor training imagery as input training data, such as a deep learning network trained using the method 100 of FIG. 1. At block 806, the method 800 includes producing an estimated vehicle location sensor point cloud distribution based on the estimated vehicle location sensor point cloud distribution similar to the estimated vehicle location sensor point cloud distribution 750 of FIG. 7. At block 808, the method 800 includes utilizing the estimated sensor point cloud distribution.

Similar to general estimated sensor point cloud distributions, estimated vehicle location sensor point cloud distributions can be used as the basis for any of a number of applications (potentially in combination with general estimated sensor point cloud distributions, as discussed above), ranging from notifying an occupant of a vehicle of an approaching vehicle to directly controlling a vehicle, e.g., applying brakes to avoid colliding with an approaching vehicle. As alluded to above, in some embodiments, the estimated vehicle location sensor point cloud distribution is used to improve live sensor data, or an estimated vehicle location PDF or estimated vehicle location sensor point cloud distribution is modified based on live sensor data to produce an improved estimated vehicle location sensor point cloud distribution. In some embodiments, the estimated vehicle location PDF or estimated vehicle location sensor point cloud distribution is used to increase the granularity and/or dimensionality of live sensor data, e.g., by adding sensor points and/or converting 2D (or 3D) live sensor data to 3D (or 4D) live sensor data. In some embodiments, the estimated vehicle location PDF or estimated vehicle location sensor point cloud distribution is used, along with corresponding vision sensor data, as training data for other machine learning applications. Thus, methods disclosed herein are not only usable for producing estimated vehicle location sensor data from vision sensor data for the purposes of utilizing that estimated vehicle location sensor data in a live or "real-time" application, but also for producing vast quantities of estimated vehicle location sensor data for vision sensor data in order to enable further deep learning applications that may require such quantities of corresponding sensor data and vision sensor data.

Figure 9:
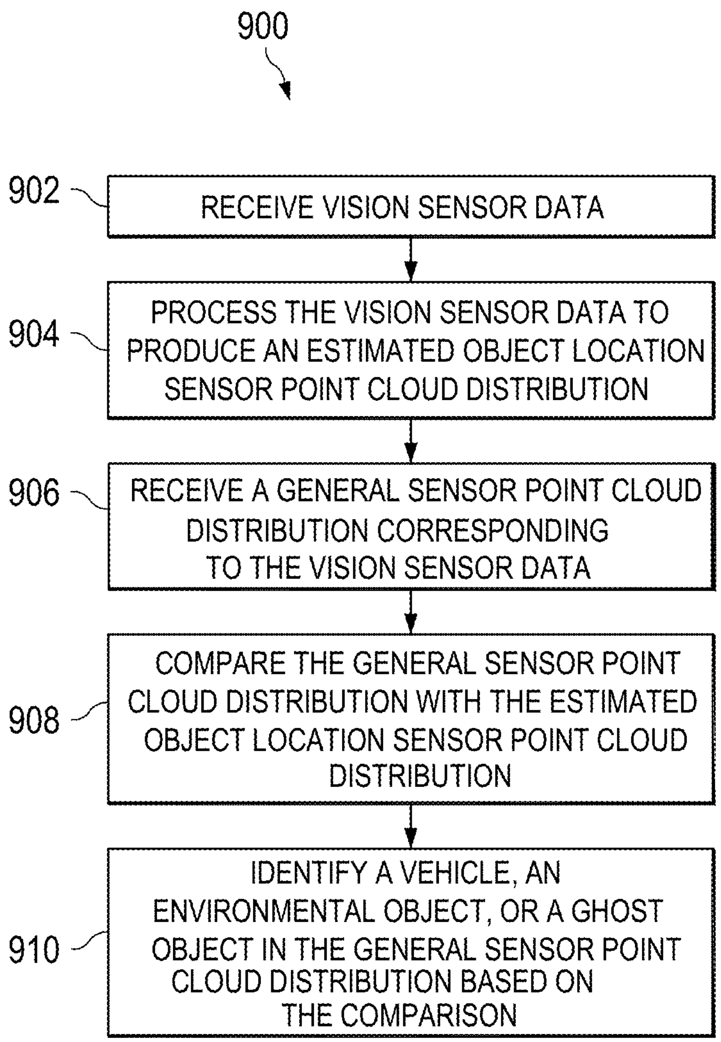
FIG. 9 is a block diagram of a method of producing and using an estimated vehicle location sensor point cloud distribution based on vision sensor data in accordance with some embodiments.

FIG. 9 illustrates a method 900 of producing and using an estimated vehicle location sensor point cloud distribution based on vision sensor data in accordance with some embodiments. As shown in FIG. 9, the method 900 includes, at block 902, receiving vision sensor data, such as the photographic image 200 of FIG. 6. At block 904, the method 900 includes processing the vision sensor data to produce an estimated vehicle or object location sensor point cloud distribution, which may be produced using techniques described hereinabove such as those of method 800. At block 906, the method 900 includes receiving a general sensor point cloud distribution corresponding to the vision sensor data, which may be generated based on sensor data located in or on a vehicle or received from another source, such as an automated road or highway sensor broadcast. At block 908, the method 900 includes comparing the general sensor point cloud distribution with the estimated object location sensor point cloud distribution. At block 910, the method 900 includes identifying a vehicle, an environmental object, or a ghost object in the general sensor point cloud distribution based on the comparison, which may include comparing confidences and/or likelihoods of an estimated object or vehicle location sensor point cloud distribution and a general sensor point cloud distribution as discussed hereinabove. Accordingly, the method 900 provides for a fusion of method 300 of FIG. 3 and method 700 of FIG. 7, enabling a CNN such as CNN 104 to train a parametric estimation model such as a GMM to obtain a probability distribution of first point cloud distributions (e.g., estimated sensor point cloud distribution 450) and second detection/vehicle point cloud distributions (e.g., estimated vehicle location sensor point cloud distribution 750). A posteriori point cloud distributions, including, e.g., vehicle, environmental object, and/or ghost objects, are then obtained based on the trained machine learning model such as CNN 104, enabling classification or weighting (e.g., confidence weighting) of points in the a posteriori point cloud distribution based on whether the points therein are more likely to be vehicles, environmental objects, and/or ghost objects.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

receiving vision sensor data;

processing the vision sensor data to produce an estimated object location sensor point cloud distribution, wherein the estimated object location sensor point cloud distribution includes estimated radar points having range, azimuth, elevation, and Doppler information;

receiving a general sensor point cloud distribution corresponding to the vision sensor data, wherein the general sensor point cloud distribution is a radar point cloud distribution that includes radar points having range and azimuth information;

comparing the general sensor point cloud distribution with the estimated object location sensor point cloud distribution; and identifying a vehicle, an environmental object, or a ghost object in the general sensor point cloud distribution based on the comparison.

2. The method of claim 1, wherein the vision sensor data includes one or more camera images.

3. A method comprising:

receiving vision sensor data;

processing the vision sensor data to produce an estimated object location sensor point cloud distribution;

receiving a general sensor point cloud distribution corresponding to the vision sensor data;

comparing the general sensor point cloud distribution with the estimated object location sensor point cloud distribution;

identifying a vehicle, an environmental object, or a ghost object in the general sensor point cloud distribution based on the comparison; and modifying the estimated object location sensor point cloud distribution or the general sensor point cloud distribution based on the comparison.

4. The method of claim 3, wherein the modifying includes increasing or decreasing a confidence level associated with a region of the general sensor point cloud distribution.

5. The method of claim 1, further comprising identifying a vehicle in the general sensor point cloud distribution when the estimated object location sensor point cloud distribution includes a high likelihood region coinciding with a high likelihood region of the general sensor point cloud distribution.

6. The method of claim 1, further comprising identifying an environmental object in the general sensor point cloud distribution when the estimated object location sensor point cloud distribution includes a low likelihood region coinciding with a high likelihood region of the general sensor point cloud distribution.

7. The method of claim 1, further comprising identifying a ghost object in the general sensor point cloud distribution when the estimated object location sensor point cloud distribution includes a low likelihood region coinciding with a low likelihood region of the general sensor point cloud distribution.

8. The method of claim 1, further comprising controlling a vehicle based on the comparison.

9. The method of claim 1, further comprising providing a notification to an occupant of a vehicle based on the comparison.

10. The method of claim 1, further comprising:

processing the vision sensor data to estimate a vehicle location sensor point cloud distribution, wherein the processing is performed using a deep learning network trainable using only vision sensor training imagery and other training data corresponding to the vision sensor training imagery as input training data; and producing the vehicle location sensor point cloud distribution based on the estimated vehicle location sensor point cloud distribution.

11. The method of claim 1, wherein receiving the vision sensor data and receiving the general sensor point cloud distribution corresponding to the vision sensor data include generating the vision sensor data and the general sensor point cloud distribution using sensors.

12. A non-transitory computer readable medium embodying a set of executable instructions, the set of executable instructions to manipulate at least one processor to:

receive vision sensor data;

process the vision sensor data to produce an estimated object location sensor point cloud distribution;

receive a general sensor point cloud distribution corresponding to the vision sensor data;

compare the general sensor point cloud distribution with the estimated object location sensor point cloud distribution;

identify a vehicle, an environmental object, or a ghost object in the general sensor point cloud distribution based on the comparison; and modify the estimated object location sensor point cloud distribution or the general sensor point cloud distribution based on the comparison.

13. The non-transitory computer readable medium of claim 12, wherein the modifying includes increasing or decreasing a confidence level associated with a region of the general sensor point cloud distribution.

14. The non-transitory computer readable medium of claim 12, wherein the set of executable instructions further manipulate the at least one processor to:

identify a vehicle in the general sensor point cloud distribution when the estimated object location sensor point cloud distribution includes a high likelihood region coinciding with a high likelihood region of the general sensor point cloud distribution.

15. The non-transitory computer readable medium of claim 12, wherein the set of executable instructions further manipulate the at least one processor to:

identify an environmental object in the general sensor point cloud distribution when the estimated object location sensor point cloud distribution includes a low likelihood region coinciding with a high likelihood region of the general sensor point cloud distribution.

16. A method comprising:

receiving vision sensor data;

processing the vision sensor data to estimate a vehicle location sensor point cloud distribution, wherein the processing is performed using a deep learning network trainable using only vision sensor training data and other training data corresponding to the vision sensor training data as input training data, and wherein the estimated vehicle location sensor point cloud distribution includes estimated radar points having range, azimuth, elevation, and Doppler information; and producing the estimated vehicle location sensor point cloud distribution corresponding to a general sensor point cloud distribution, wherein the general sensor point cloud distribution is a radar point distribution that includes radar points having range and azimuth information.

17. The method of claim 16, wherein the vision sensor data is the vision sensor training data, the method further comprising:

comparing the estimated vehicle location sensor point cloud distribution with the other training data corresponding to the vision sensor training data to obtain a loss function; and updating the deep learning network based on the loss function.

* * * * *